(12) United States Patent
Bansal et al.

(10) Patent No.: US 11,799,901 B2
(45) Date of Patent: Oct. 24, 2023

(54) PREDICTIVE RATE LIMITING SYSTEM FOR CLOUD COMPUTING SERVICES

(71) Applicant: Salesforce, Inc., San Francisco, CA (US)

(72) Inventors: Kaushal Bansal, Pleasanton, CA (US); Vaibhav Tendulkar, San Francisco, CA (US); Rakesh Ganapathi Karanth, San Mateo, CA (US); Fangchen Richard Sun, Ithaca, NY (US)

(73) Assignee: Salesforce, Inc., San Francisco, CA (US)

(*) Notice: Subject to any disclaimer, the term of this patent is extended or adjusted under 35 U.S.C. 154(b) by 589 days.

(21) Appl. No.: 16/750,892

(22) Filed: Jan. 23, 2020

(65) Prior Publication Data

US 2021/0234890 A1    Jul. 29, 2021

(51) Int. Cl.
*H04L 29/06* (2006.01)
*H04L 9/40* (2022.01)
(Continued)

(52) U.S. Cl.
CPC .......... *H04L 63/1458* (2013.01); *G06N 5/04* (2013.01); *G06N 20/00* (2019.01)

(58) Field of Classification Search
CPC ............. H04L 63/1458; H04L 63/0227; H04L 2463/144; G06N 5/04; G06N 20/00;
(Continued)

(56) References Cited

U.S. PATENT DOCUMENTS 5,577,188 A   11/1996  Zhu
5,608,872 A   3/1997   Schwartz et al.
(Continued)

FOREIGN PATENT DOCUMENTS

WO   WO-2023006205 A1 *   2/2023   ............. G06N 20/20

OTHER PUBLICATIONS

Yukihiro Watanabe; Hiroshi Otsuka; Masataka Sonoda; Shinji Kikuchi; Yasuhide Matsumoto; "Online failure prediction in cloud datacenters by real-time message pattern learning"; 4th IEEE International Conference on Cloud Computing Technology and Science Proceedings; Year: 2012; pp. 504-511 (Year: 2012).*

(Continued)

*Primary Examiner* — Shewaye Gelagay
*Assistant Examiner* — Courtney D Fields
(74) *Attorney, Agent, or Firm* — Kwan & Olynick LLP

(57) ABSTRACT

Examples include a method of predictive rate limiting for performing services requested by a client in a cloud computing system. The method includes receiving a request from a client for one of a plurality of services to be performed, the client belonging to an organization; and determining a current threshold for the organization by applying a real time data model and a historical data model, the real time data model generating a first threshold at least in part by determining a number of requests received from the organization over a first preceding period of time; the historical data model generating a second threshold, the historical data model being generated by applying a machine learning model to historical data stored during processing of previous requests for the plurality of services from the organization over a second preceding period of time, the current threshold being the average of the first threshold and the second threshold. The method further includes performing the requested service when the current threshold is not exceeded; and denying the request when the current threshold is exceeded.

26 Claims, 7 Drawing Sheets

(51) Int. Cl.
  *G06N 5/04* (2023.01)
  *G06N 20/00* (2019.01)
  *H04L 67/306* (2022.01)
  *G06N 20/20* (2019.01)

(58) Field of Classification Search
  CPC ........ G06N 20/20; G06N 3/0445; G06N 3/08; G06N 5/003; G06N 20/10
  See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 9,720,736 B2 | 8/2017 | Kochunni |
| 10,628,267 B2 | 4/2020 | Pradhan |
| 10,673,943 B2 | 6/2020 | Pradhan |
| 10,749,813 B1 | 8/2020 | Zhao |
| 10,783,472 B2 | 9/2020 | Carpenter |
| 10,929,247 B2 | 2/2021 | Fair |
| 11,016,813 B2 | 5/2021 | Filho |
| 11,068,460 B2 | 7/2021 | Zait |
| 11,113,110 B2 | 9/2021 | Thammaiah |
| 11,122,002 B2 | 9/2021 | Dennis |
| 11,126,351 B2 | 9/2021 | Liu |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0177744 A1 | 7/2009 | Marlow et al. |
| 2012/0210333 A1 | 8/2012 | Potter |
| 2014/0328344 A1 | 11/2014 | Bosshart |
| 2016/0283274 A1 | 9/2016 | Kochunni |
| 2018/0046926 A1* | 2/2018 | Achin ............ G06N 20/20 |
| 2019/0317697 A1 | 10/2019 | La Fratta |
| 2020/0186445 A1 | 6/2020 | Govindaraju |
| 2020/0241903 A1 | 7/2020 | Wang |
| 2021/0073379 A1 | 3/2021 | Gibbs |

(56) References Cited

U.S. PATENT DOCUMENTS

2021/0157704 A1* 5/2021 Parthasarathy ..... G06F 11/3409
2021/0192280 A1* 6/2021 Zhang ................. G06N 20/20

OTHER PUBLICATIONS

Baena-Garcia, et al, "Early Drift Detection Method", Departamento de Lenguajes y Ciencias de la Computacion E.T.S. Ingeniena Informatica. Universidad de Malaga, Spain, downloaded from https://www.researchgate.net/publication/245999704_Early_Drift_Detection_Method, Jan. 2006, 10 pages.

Brownlee, Jason, "A Gentle Introduction to Concept Drift in Machine Learning", Machine Learning Mastery, Making Developers Awesome at Machine Learning, downloaded from https://machinelearningmastery.com/gentle-introduction-concept-drift-machine-learning, Dec. 15, 2017, 17 pages.

Gama, et al, "Learning with Drift Detection", LIACC—University of Porto Rua Campo Alegre 823, 4150 Porto, Portugal, Part of the Lecture Notes in Computer Sciencebook series (LNCS, vol. 3171, downloaded from https://link.springer.com/chapter/10.1007/978-3-540-28645-5_29, Apr. 29, 2020. 10 pages.

Hochreiter, et al, "Long Short-Term Memory", Neural Computation 9(8): 1735-1780, 1997, downloaded from https://www.bioinf.jku.at/publications/older/2604.pdf, Apr. 29, 2020, 32 pages.

Office Action (Non-Final Rejection) dated Dec. 27, 2021 for U.S. Appl. No. 16/798,008 (pp. 1-21).

Office Action (Final Rejection) dated Jul. 8, 2022 for U.S. Appl. No. 16/798,008 (pp. 1-20).

Office Action (Non-Final Rejection) dated Jan. 6, 2023 for U.S. Appl. No. 16/798,008 (pp. 1-16).

* cited by examiner

PREDICTIVE RATE LIMITING SYSTEM FOR CLOUD COMPUTING SERVICES

BACKGROUND

The field of invention relates generally to managing access to cloud computing services, and, more specifically, to a system for dynamically adjusting a predictive rate limiting process.

Cloud computing services provide shared resources, software, and information to computers and other devices upon request or on demand. Cloud computing typically involves the over-the-Internet provision of dynamically scalable and often virtualized resources. Technological details can be abstracted from end-users (e.g., client computing systems), who no longer have need for expertise in, or control over, the technology infrastructure "in the cloud" that supports them. In cloud computing environments, software applications can be accessible over the Internet rather than installed locally on personal or in-house computer systems. Some of the applications or on-demand services provided to clients can include the ability for a user to create, view, modify, store and share documents and other files.

In some scenarios, access to cloud computing services by clients may be affected by the available system resources of the cloud computing environment. If too many clients are trying to access the same services at the same time, system throughput and service response times may suffer.

DETAILED DESCRIPTION

Figure 1:
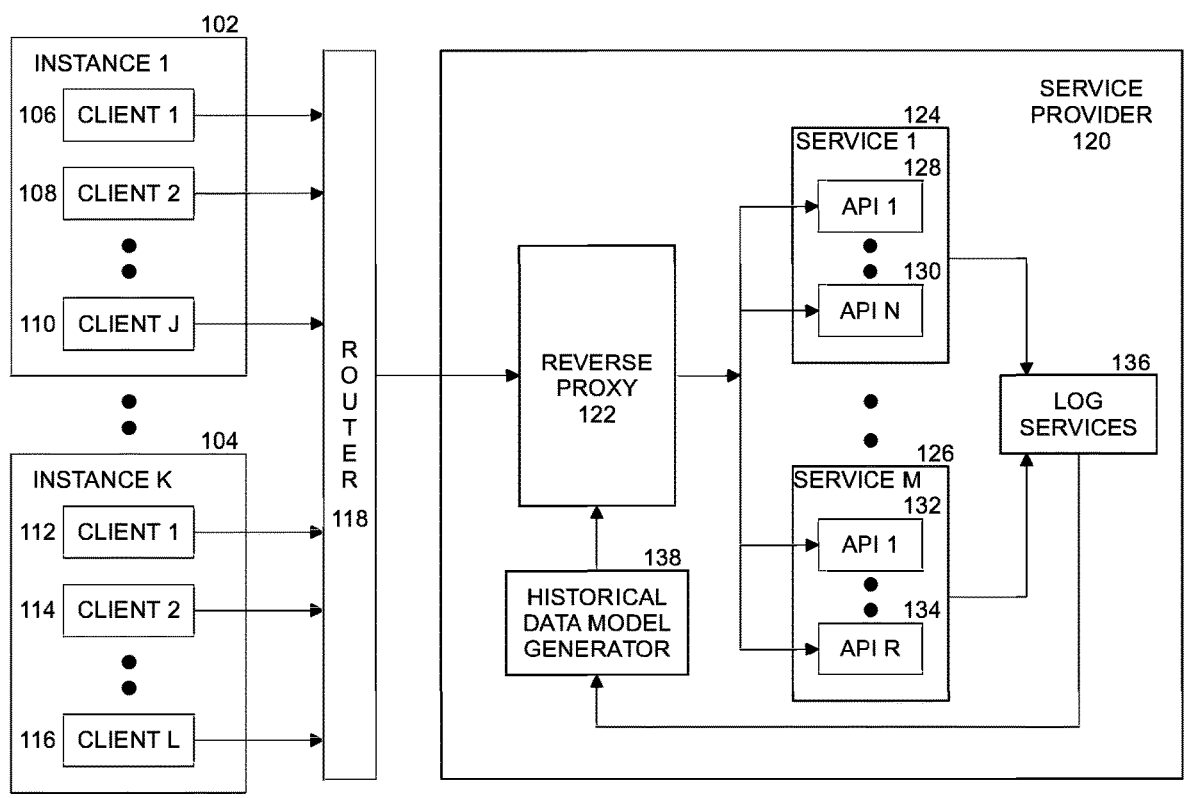
FIG. 1 illustrates a first example computing system according to some embodiments.

Rate limiting is a common solution to prevent Denial of Service (DoS) attacks and other throughput problems by limiting the maximum number of application programming interface (API) calls that a client computing system can make to a cloud computing system (e.g., computer servers in a data center). This prevents any single client from consuming too many critical computing resources of the cloud computing system and ensures a fair distribution of those resources.

In the case of static rate limiting, a fixed upper bound can be set on the number of API calls that a single client can make in a given period of time. Let's assume that the system has a bandwidth to successfully serve X requests per minute. For example, if there are 100 clients, the bandwidth can be divided equally so that each client can now successfully make (X/100) requests in a minute. Once this amount has been exceeded by the client, the client will receive an error message (such as "hyper-text transport protocol (HTTP) 429 Too Many Requests") in response and the client's request will not be processed.

Static rate limiting is effective at stopping automated "bots" which try to send out a burst of API calls and use up cloud computing resources. However, in some scenarios, legitimate clients send requests to the cloud computing system in the form of a burst of requests and then remain dormant for a long time. When a static rate limiting approach is used, the cloud computing system may end up throttling this burst of requests even if the client sends this burst infrequently (such as once or twice a day, for example) and remains dormant for the rest of the time. Also, as very few clients are typically active at any given point of time, it is inefficient to throttle the bursts coming from these clients because a large part of the available bandwidth of the cloud computing system at the time remains unused.

For example, assume there are 100 clients and only five are currently active. Throttling these clients at (X/100) requests per minute might not prove to be the most efficient solution as 95% of bandwidth is left unused. Instead, an efficient solution should accommodate this burst by adjusting the rate limit for the client dynamically (e.g., "on the fly") based on factors such as how many clients are currently active, how much of the bandwidth is currently unused and how many more requests can be expected/predicted from this client or other clients (based on past behavior of the client or other clients). Once the rate limit for the client has been dynamically adjusted, the client can send out more requests than the static rate limit. However, this comes at the cost of temporarily decreasing the rate limit of other, currently dormant clients. Once these dormant clients start sending in requests, a rate limiting process might have to decrease the rate limit that was previously increased for the first client. Hence, in a use case which consists of a short burst of requests from clients followed by long dormant periods, not many active clients at a time and a potential for using up unused bandwidth, a dynamic rate limiting approach outperforms a static rate limiting approach.

Embodiments of the present invention provide for a system for dynamically and predictively adjusting a variable rate limiting process in near real-time for allowing client requests to access cloud computing services. The system uses a short-term real-time data model and a long-term historical data model to adaptively enforce limited rates of access to cloud computing services by clients.

FIG. 1 illustrates a first example computing system 100 according to some embodiments. Computing system 100 includes a plurality of instances of client computing systems such as instance 1 102 . . . instance K 104, where K is a natural number. In an embodiment, an instance (also known as a pod) is a set of hardware and services that hosts the applications and data for a set of customer organizations (called orgs herein). A single instance can house multiple orgs. Each instance includes a plurality of clients, such as client 1 106, client 2 108, . . . client J 110 of instance 1, through client 1 112, client 2 114, . . . client L 116 of instance K 104, where J and L are natural numbers. In an embodiment, a client belongs to an org hosted by a cloud service provider (CSP) (e.g., organization). An org includes an identifier representing a client's version of a Software as a Service (SaaS) provided by the CSP and the data within an instance. Clients send requests (not shown) to access services provided by service provider 120. The number of requests sent by each client may be any number at any time (e.g., they may be at a fixed rate, in bursts, at random, and so on). In large scale cloud computing environments, the number of requests being sent to service provider 120 may be in the thousands, tens of thousands, hundreds of thousands, or even millions per time period (e.g., per minute, per hour, per day, etc.). Service provider 120 is shown logically in FIG. 1 as a monolithic computer server, but in various embodiments service provider 120 may comprise any number of communicating computer servers in one or more data centers in any one location or more locations around the world. Requests from clients are received by router 118 and forwarded to service provider 120. In some embodiments, clients send requests to router 118 over a communications network (not shown in FIG. 1) such as the Internet.

Service provider 120 comprises a plurality of services, shown in FIG. 1 as service 1 124 . . . service M 126, where M is a natural number. Each service comprises one or more application programming interfaces (APIs). For example, service 1 124 comprises API 1 128 . . . API N 130, . . . service M 126 comprises API 1 132 . . . API R 134, where N and R are natural numbers. Each request from a client calls an API in a service in service provider 120. In embodiments, a service may perform any one or more data processing functions needed by a client. In one example, a quote calculator service determines quote and quote line prices in response to user or automated actions. In another example, a pricing guidance service uses historical quote data and product pricing trends to suggest target, norm, and floor discount amounts.

Log services 136 comprise one or more components to obtain metrics data about requests handled by services. Reverse proxy 122 receives requests from router 118, routes requests to selected services 124 . . . 126, and enforces a rate limit for one or more clients sending requests. In an embodiment, common rate limits are applied to all requests coming from an org (e.g., set of clients). In another embodiment, different rate limits (e.g., threshold) are applied for client requests for one or more services. In an embodiment, common rate limits are applied to all requests coming from an instance. In another embodiment different rate limits are applied for client requests from the same instance for one or more services. Historical data model generator 138 obtains historical data from log services 136 regarding previously processed requests for services and generates a historical data model for use by reverse proxy 122 in processing rate limiting requests to access services.

Figure 2:
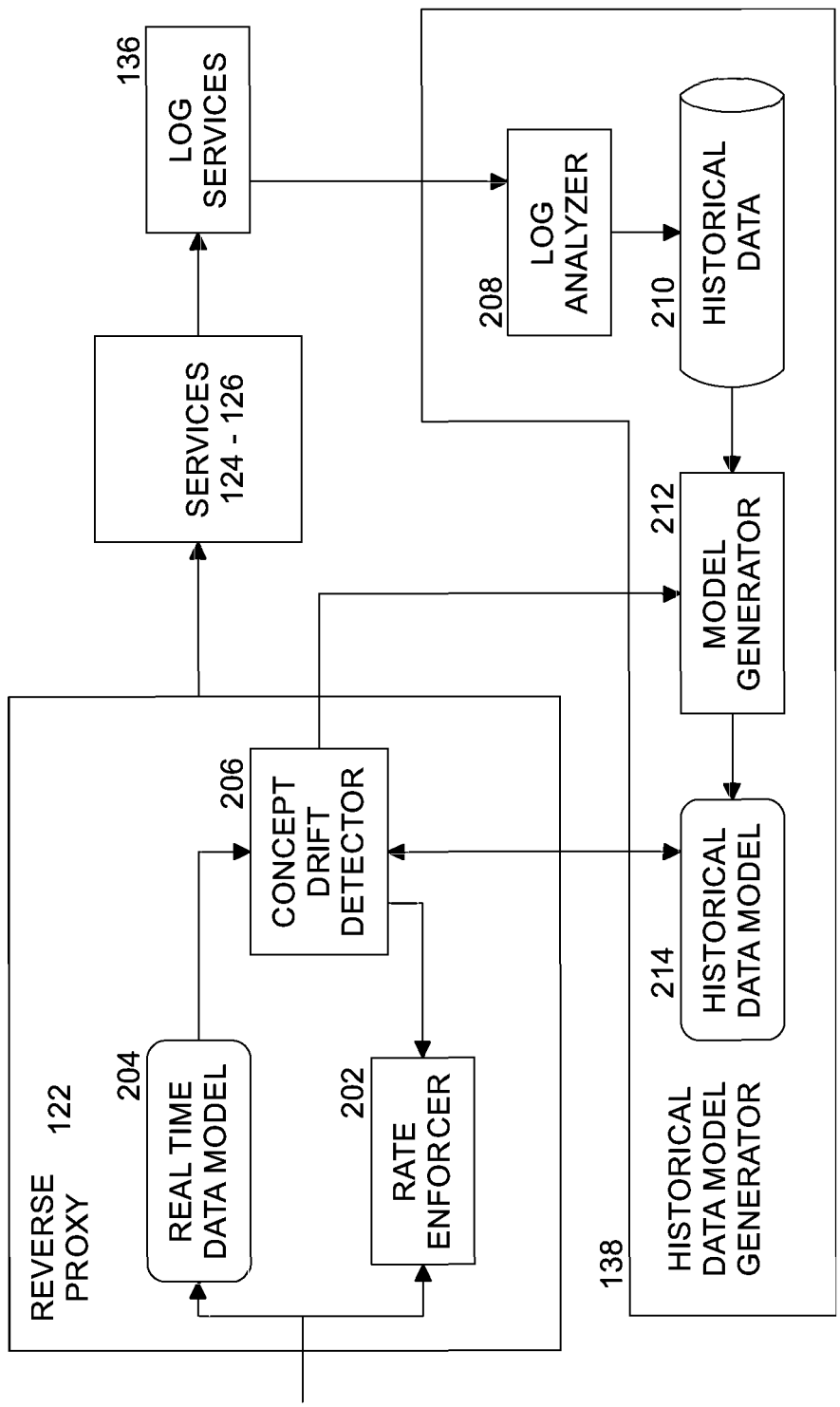
FIG. 2 is a second example computing system according to some embodiments.

FIG. 2 is a second example computing system according to some embodiments. FIG. 2 provides further details regarding service provider 120 of FIG. 1. Reverse proxy 122 includes rate enforcer 202 to apply near real-time thresholds for clients based at least in part on a short term, real-time data model 204 and a long-term, historical data model 214. Reverse proxy 122 starts off by applying a static rate limit for routing client requests and makes updates to rate limits based at least in part on real-time traffic according to real time data model 204 and historical request patterns according to historical data model 214. Requests are passed to services 124 . . . 126 if the requests meet the parameters set according to ongoing and dynamic analysis of real time data model 204, historical data model 214, and the current flow of requests.

Log services 136 collect metrics about requests and services performed by service provider 120. In an embodiment, metrics include processing log information accumulated from one or more services.

In an embodiment, log analyzer 208 runs "cron" jobs which run predefined Domain Specific Language (DSL) based queries on metrics collected by log services 136 to generate a database of historical data 210. Historical data 210 can then be used as an input for historical data model generation. Log analyzer 208 parses log information included in the collected metrics. For example, log information could include a time series representation on what kind of API flows are called by clients, and/or a distribution of various flows based on time for different clients. Other types of log information may also be used. The timestamp of the request in log services 136 can be parsed to figure out what hour of the day and day of the week in which the request was made and this information can be stored in historical data 210. This information can be used to figure out what hour of the day or day of the week the org is most likely to be active. Log parsing is responsible for removing information from log services 136 that is irrelevant to model generator 212. For example, for generating the historical model, it is not necessary to determine the body of the application programming interface (API) call, the type of response returned by the service, and how long the service took to process the request.

Parsed log information is stored in historical data 210. Since the metrics data keeps growing over time as system 100 is running, log analyzer 208 serves as a coalescing and/or filtering component in the system to only store historical data filtered from logs that is useful by historical data model generator 138. In some embodiments, historical data 210 captures all information obtained and filtered by log analyzer over a period of time (e.g., weeks, months, years, and so on). Generally, the more data collected and fed to model generator 212, the better the results of predictive rate limiting by rate enforcer 202. Other types of log information can also be stored in historical data 210, such as frequency, type, and timing of requests; minimum, average and maximum number of requests per unit time; by client, by instance, by organization, by type, by sub-type, by API, hour of the day, day of the week, whether the day was a weekend, whether the day was a public holiday (This information would, for example, help determine whether the org is particularly active during the weekend or on a public holiday).

In an embodiment, model generator 212 is used to select a machine learning model that will be the best fit for generating historical data model 214. This process involves first dividing the historical data 210 into three sets: a training data set, a cross-validation data set and test data set. The training data set is used to train a plurality of machine learning models and tune their hyper-parameters using the cross-validation data set. In an embodiment, the model that performs "best" on the cross-validation data set is chosen as historical data model 214. The trained model is then tested using the test set data to give an unbiased estimate of performance. Measurement and comparison of performance of the machine learning models is implementation dependent and any suitable method may be used.

Over time the historical data models can become stale and the predictions may no longer be accurate. This situation requires a re-training phase which can be done in at least one of two ways. First, in one embodiment, a cron-based service can be started where historical data model 214 is re-trained on a predetermined fixed time schedule (e.g., once every few hours, once per day, etc.). Second, in another embodiment, retraining may be trigger-based, where model decay is measured by concept drift detector 206. If concept drift detector determines that the deployed historical data model 214 is stale, then predictions are no longer useful with the current version of the historical data model because the previously deployed model has not been trained to take into account newly observed data points obtained by log analyzer 208. In embodiments, determination of staleness is made by applying one of several known methods, such as "Early Drift Detection Method" by Manuel Baena-Garcia, et al., Mar. 20, 2009; "Learning with Drift Detection: by Joao Gama, et al., SBIA Brazilian Symposium on Artificial Intelligence, 2004; or "A Gentle Introduction to Concept Drift in Machine Learning" by Jason Brownlee, machinelearningmastery.com, Aug. 12, 2019. Other methods may also be used. Training (and re-training) of historical data model 214 is expensive from the standpoint of the time needed and computational resources consumed. Thus, training (and re-training) are to be performed only when necessary according to a measure of staleness.

In an embodiment, since each org exhibits unique behavior with respect to requests, a unique historical data model 214 is generated and trained for use by reverse proxy 122 in handling requests from a particular org. In one embodiment, historical data model 214 produces a numeric output value describing a predicted throughput for the organization. For example, if the historical data model observes that an org has high throughput between 10 am and 10:15 am every weekday (e.g., a certain time of day of previous requests for a service), the model will predict a high numerical value for the org's throughput during that time interval. As the number of requests from the org are anticipated to increase, the bandwidth for that org can be increased just before that time period. This will be accompanied by decreasing the throughput for orgs which are predicted by the model to remain relatively dormant during this time period.

In an embodiment, a temporal machine learning model such as Long Short-Term Memory networks may be used, such as is described in "Long Short-Term Memory" by Sepp Hochreiter and Jurgen Schmidhuber, Neural Computation 9(8):1735-1780, 1997.

Historical data model 214 is used to capture the time-sensitive and/or seasonality of incoming request traffic from clients and/or organizations. For example, some organizations only send in requests on weekdays during working hours of 9 am to 5 μm and are dormant the rest of the time, while other organizations send in requests at a specific time of day. Historical data model 214 captures this temporal behavior (e.g., client requests on certain days of the week) and accordingly predicts when an organization will become active based on past behavior. This is advantageous because if the historical data model gives an indication that an organization is about to send a burst of requests, bandwidth can be reserved on behalf of an org by rate enforcer 202 for the upcoming expected burst and bandwidth can be temporarily reduced for organizations predicted to be dormant during the expected burst.

The input to historical data model 214 is historical data 210 which contains features extracted by log analyzer 208. The output of the historical data model are numeric values indicating the rate limit for each org. The model which is used to predict these values depends on which model performs best in model generator 212. Some models that can be incorporated include feed forward neural networks, support vector machines, long short-term memory networks (LSTMs).

Real time data model 204 analyzes real time requests passing through reverse proxy 122 and provides guidance to rate enforcer 202 on how different clients are requesting services and how rate enforcer 202 can use this guidance to tune the rate limits (e.g., current thresholds) for these clients. Concept drift detector 206 adjusts the rates based on inputs from historical data model 214 and real time data model 204. Concept drift detector 206 outputs a numeric value which represents the rate limit for the org. This rate limit is input to rate enforcer 202 which intercepts the request, finds out the org id and then drops or accepts the request based on the rate limit of the org as per the concept drift detector.

Real time data model 204, as opposed to historical data model 214, only considers the number of requests from each org in the current time period while making decisions as to whether to accept or drop the request from an org. Thus, the real time data model has no historical knowledge about what the throughput of the org has been in the past hour, day or week. One process that can be used here is an additive-increase/multiplicative-decrease (AIMD) process (which has previously been used to handle transmission control protocol (TCP) congestion control problems).

In an embodiment, the data input to real time data model 204 is the current throughput of each org (e.g., how many requests each org has sent in the current time period (as opposed to historical data)). The current time period refers to either minutes/hours/seconds depending on whether the rate limit is per minute/per hour or per second). The data output from real time data model 204 (just like historical data model 214) is a numeric value for each org which represents the rate limit for the org based on its current behavior (as opposed to its historical behavior).

One reason for including a real time rate limiter (in conjunction with the historical data model) is to cause the system to be more reactive as well as predictive. The real time data model is lightweight in terms of computational resources needed and thus the output of the real time data model may be computed quickly, otherwise the latency of processing the request would be impacted. One reason for including the real time data model in the system is to reduce failure rates for the client whose share of the bandwidth has been allocated to another client who is experiencing a sudden surge in terms of service usage requirements. If the former client who was dormant starts sending requests again, the real time data model helps the former client reactively reclaim bandwidth.

In a dynamically changing computing environment, changing request patterns influence how the services should be shared amongst all the clients. As used herein, concept drift means that the statistical properties of the target variable (in this case, the target variable is the rate limit (e.g., current threshold) for an org), which the real time data model 204 and historical data model 214 is trying to predict, can change over time in unforeseen ways. This can cause problems for the system because predictions can become less accurate over time.

Real time data model 204 by design has a short term (e.g., "myopic") view of incoming requests. To counter this effect, the system includes historical data model 214 to capture nuanced service request usage patterns. For example, historical data model 214 might indicate that a first client sends out requests between 8 pm and 12 am every weekday. If there is a sudden surge in request traffic by a second client at 7:55 pm, the recommendation of real time data model 204 might be to take any available capacity (including the first client's capacity) to service this sudden surge in traffic. Historical data model 214 would curb the real time data model's reactive responses because the historical data model anticipates that the first client will send request traffic very soon and that the rate limit for the first client should not be lowered.

Concept drift detector 206 can also be used to detect decay and/or degradation of historical data model 214 and trigger an alert, which could be used by model generator 212 to rebuild/retrain the historical data model 214. Concept drift detector 206 dynamically determines the rate limit (e.g., current threshold) for an org (e.g., a client) that rate enforcer 202 uses to approve or deny routing of requests to services. The rate limit is the average of a first threshold determined by real time data model 204 based at least in part on a flow of requests received in a first preceding period of time and a second threshold determined by historical data model 214 based at least in part on a flow of requests received in a second preceding period of time.

In an embodiment, the first preceding period of time is relatively short, such as ten minutes, 30 minutes, one hours, etc. In an embodiment, the second preceding period of time is relatively long, such as 12 hours, one day, two days, one week, etc. The definition of the first preceding period of time and the second preceding period of time are implementation dependent and may be set and/or changed in real time data model 204, historical data model 214, and/or concept drift detector 206.

Rate enforcer 202 processes a request received from a client via router 118 before forwarding the request, if approved according to real time data model 204 and historical data model 214, to a selected service. Rate enforcer 202 validates whether the rate limit for a given client is reached or not. Rate enforcer 202 drops requests for an organization if the requests cause the organization to exceed the currently specified rate limit for the organization. If the rate limit is not reached, rate enforcer 202 forwards the request.

Figure 3:
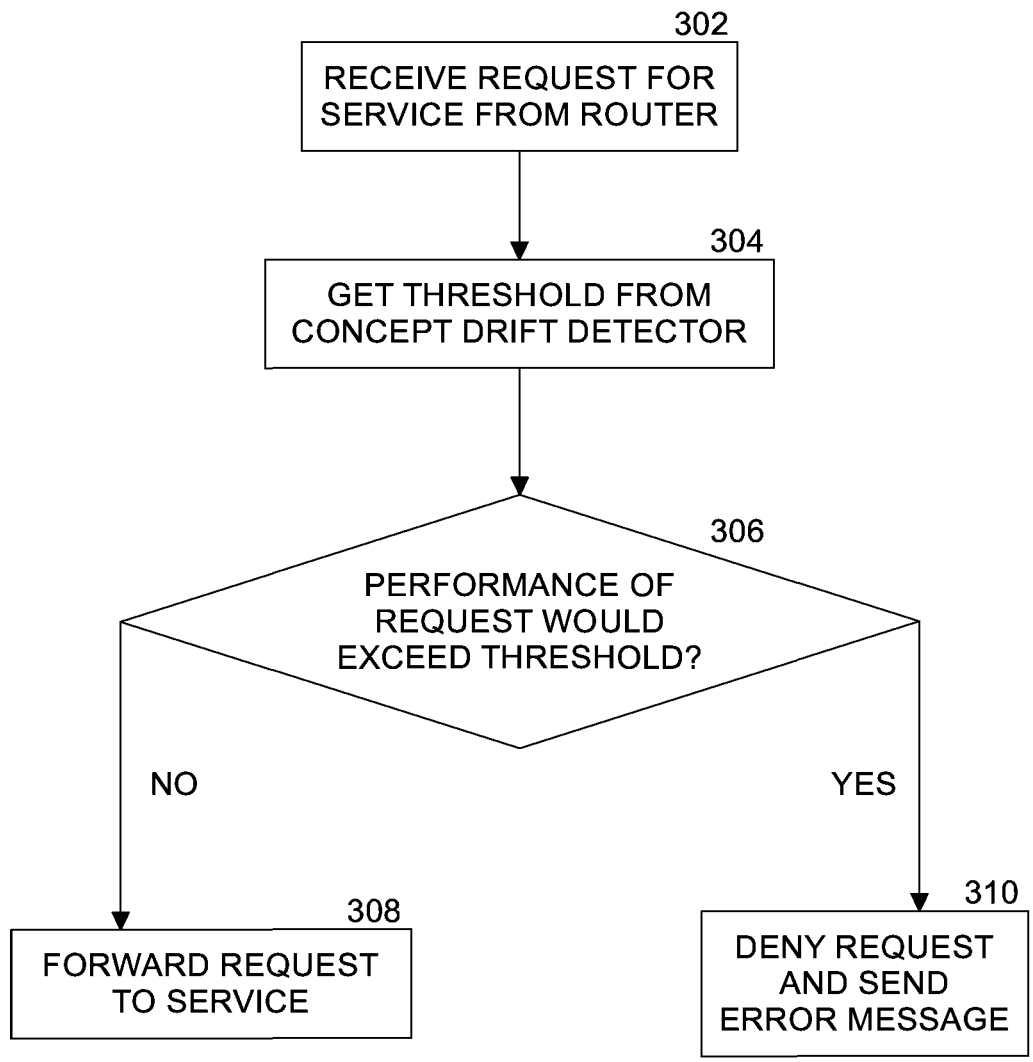
FIG. 3 is a flow diagram of example rate enforcer processing according to some embodiments.

FIG. 3 is a flow diagram 300 of example rate enforcer 202 processing according to some embodiments. At block 302, rate enforcer 202 receives a request for service from router 118. In an embodiment, the request includes an identifier of the org requesting one of services 124-126. At block 304, rate enforcer 202 gets a current threshold to be used for the org from concept drift detector 206. In another embodiment, rate enforcer 202 stores current thresholds received from concept drift detector 206 for one or more orgs internally and selects the current threshold for the org currently identified by the request. In an embodiment, each org has its own threshold. In another embodiment, a threshold is shared for a plurality of orgs. At block 306, if performance of the request by one of services 124-126 would cause the current threshold to be exceeded, then the request is denied at block 310 and an error message is sent back to the requesting client. In an embodiment, the error message includes a "HTTP 429—too many requests" message. The error message notifies the requesting client of the performance backlog so that the client can reschedule the request for a later point in time. If the current threshold will not be met by performance of the request, the request is forwarded to a selected service. Since thresholds are updated, accepting or denying the request depends on current (e.g., most recent), and historical operating conditions as determined by concept drift detector 26 as indicated by historical data model 214 and real time data model 204.

Figure 4:
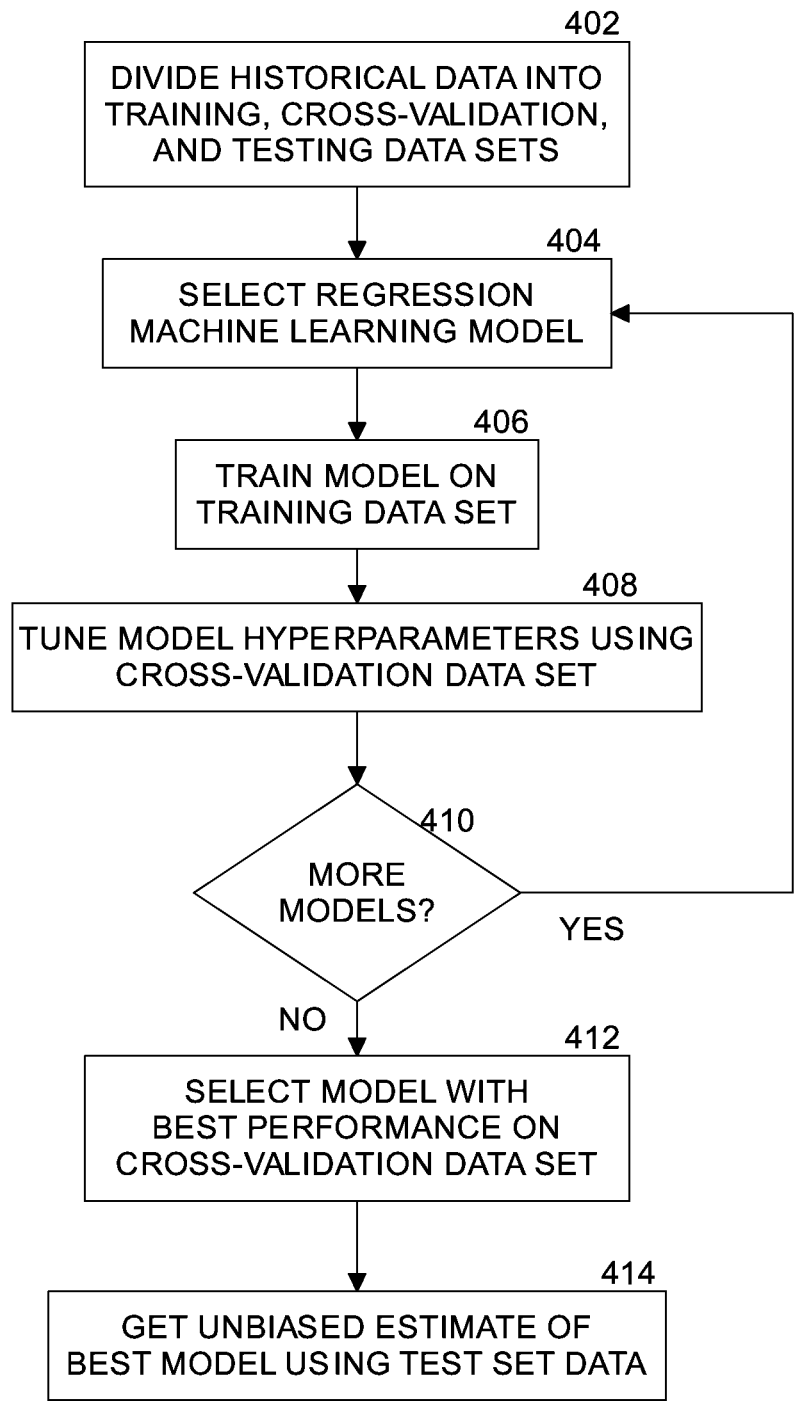
FIG. 4 is a flow diagram of example model generator processing according to some embodiments.

FIG. 4 is a flow diagram 400 of example model generator 212 processing according to some embodiments. At block 402, model generator 212 divides historical data 210 into a training data set, a cross-validation data set and a testing data set. At block 404, model generator selects a first machine learning model from a plurality of available machine learning models (e.g., artificial neural networks, decision trees, support vector machines, regression analysis, Bayesian networks, genetic algorithms, and so on). At block 406, model generator 212 trains the selected model on the training data set. At block 408, model generator 212 tunes one or more hyper-parameters for the model using the cross-validation data set. In machine learning, a hyperparameter is a parameter whose value is set before the learning process begins. By contrast, the values of other parameters are derived via training. Once hyperparameter tuning is done, the model performance is measured on the cross-validation data set. This is performed for all machine learning models to be tested. Based on the performance of all the models on the cross-validation dataset, the best performing model is chosen.

Thus, at block 410, if there are any more machine learning models available to be evaluated, processing continues with selecting a new machine learning model at block 404. Otherwise, available models have been evaluated and model generator 212 at block 412 selects the model with the "best" performance on the cross-validation data. In embodiments, what is considered to be "best" is implementation dependent. At block 414, model generator 212 checks the performance of the model on the test data set. In embodiments, any suitable measurement or evaluation of the model may be used to get an unbiased estimate of the best model. In one embodiment, the performance being measured is accuracy of the machine learning model. This model is then used as historical data model 214 until the next time model generator 212 is invoked. Thus, in one embodiment having at least two machine learning models available, a first machine learning model is selected, trained, tuned, and measured, and a second machine learning model is selected, trained, tuned, and measured. The first machine learning model is then selected if the first machine learning model performed better than the second machine learning model mas measured on the cross-validation data set, otherwise the second machine learning model is selected. This process may be repeated for a plurality of available machine learning models. In an embodiment, model generator 212 is invoked when concept drift detector 206 detects staleness. The test data set is used to get an unbiased estimate of the performance of the best model.

Figure 5:
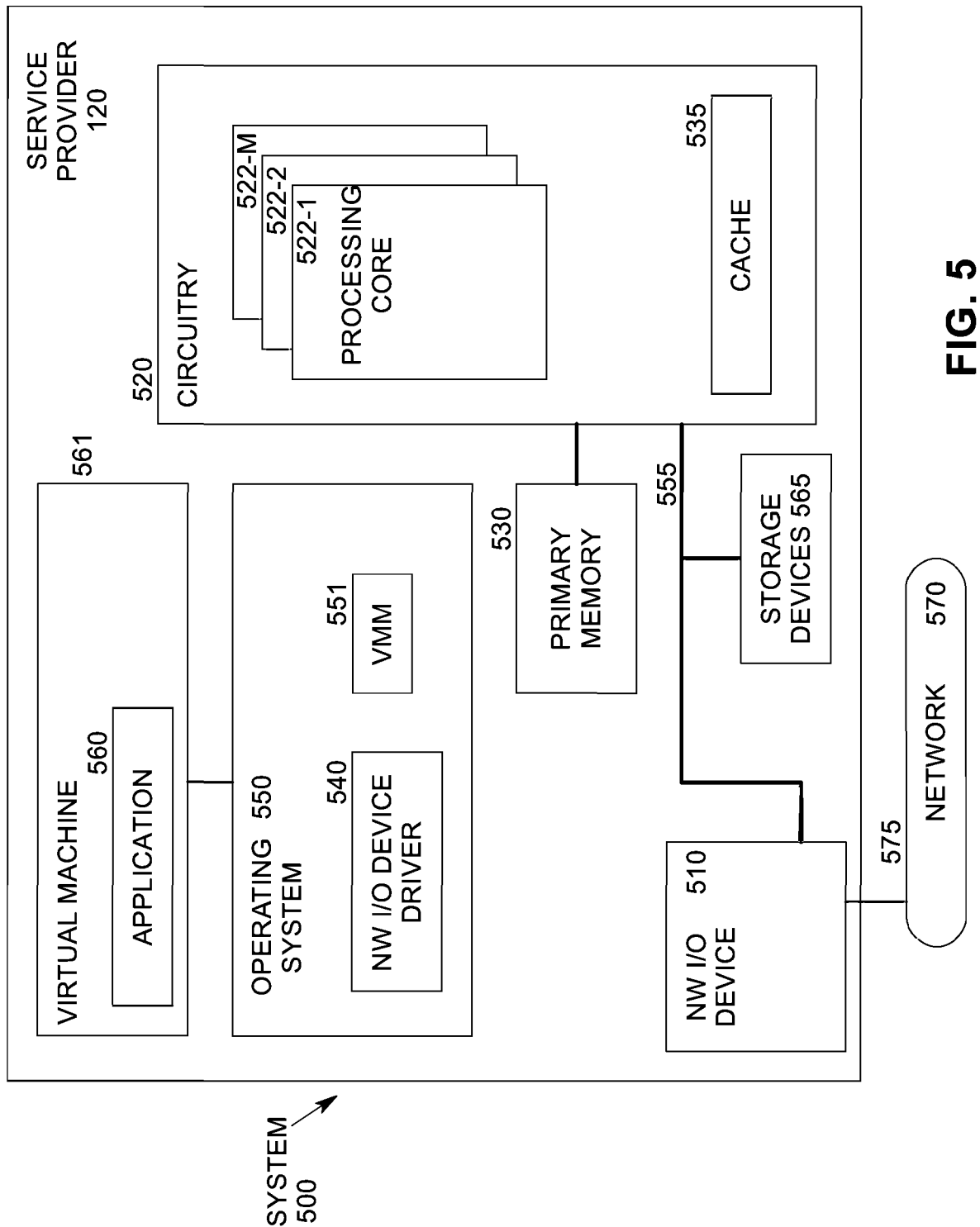
FIG. 5 illustrates an example computing system according to some embodiments.

FIG. 5 illustrates an example computing system 500. As shown in FIG. 5, computing system 500 includes a service provider 120 coupled to a network 570 (which may be the Internet, for example). In some examples, as shown in FIG. 5, service provider 120 is coupled to network 570 via network communication channel 575 and through at least one network (NW) input/output (I/O) device 510. In an embodiment, network I/O device 510 comprises a switch, a network interface controller (NIC) having one or more destination ports (not shown) connected or coupled to network communication channel 575. In an embodiment, network communication channel 575 includes a PHY device (not shown). In an embodiment, network I/O device 510 includes an Ethernet NIC. In an embodiment, network I/O device 510 comprises router 118. Network I/O device 510 transmits data packets from service provider 120 over network 570 to other destinations (such as instances and/or clients) and receives data packets from other destinations (such as instances and/or clients) for forwarding to service provider 120.

According to some examples, service provider 120, as shown in FIG. 5, includes circuitry 520, primary memory 530, operating system (OS) 550, NW I/O device driver 540, virtual machine manager (VMM) (also known as a hypervisor) 551, at least one application 560 running in a virtual machine (VM) 561, and one or more storage devices 565. In one embodiment, OS 550 is Linux™. In another embodiment, OS 550 is Windows® Server. Other OSs may also be used. In an embodiment, application 560 comprises one or more of reverse proxy 122, historical data model generator 138, services 124-126, and log services 136. Network I/O device driver 540 operates to initialize and manage I/O requests performed by network I/O device 510. In an embodiment, packets and/or packet metadata transmitted to network I/O device 510 and/or received from network I/O device 510 are stored in one or more of primary memory 530 and/or storage devices 565.

In at least one embodiment, storage devices 565 may be one or more of hard disk drives (HDDs) and/or solid-state drives (SSDs). In an embodiment, storage devices 565 may be non-volatile memories (NVMs). In some examples, as shown in FIG. 5, circuitry 520 may communicatively couple to network I/O device 510 via communications link 555. In one embodiment, communications link 555 is a peripheral component interface express (PCIe) bus conforming to version 3.0 or other versions of the PCIe standard published by the PCI Special Interest Group (PCI-SIG).

In some examples, operating system 550, NW I/O device driver 540, VM 561, and application 560 are implemented, at least in part, via cooperation between one or more memory devices included in primary memory 530 (e.g., volatile or non-volatile memory devices), storage devices 565, and elements of circuitry 520 such as processing cores 522-1 to 522-m, where "m" is any positive whole integer greater than 2. In an embodiment, OS 550, VMM 551, NW I/O device driver 540, VM 561 and application 560 are executed by one or more processing cores 522-1 to 522-m.

In some examples, service provider 120, includes but is not limited to, a server, a server array or server farm, a web server, a network server, an Internet server, a work station, a mini-computer, a main frame computer, a supercomputer, a network appliance, a web appliance, a distributed computing system, multiprocessor systems, processor-based systems, a laptop computer, a tablet computer, a smartphone, a system-on-a-chip (SoC), or a combination thereof. In one example, service provider 120 is a disaggregated server. A disaggregated server is a server that breaks up components and resources into subsystems (e.g., network sleds). Disaggregated servers can be adapted to changing storage or compute loads as needed without replacing or disrupting an entire server for an extended period of time. A server could, for example, be broken into modular compute, I/O, power and storage modules that can be shared among other nearby servers.

Circuitry 520 having processing cores 522-1 to 522-m may include various commercially available processors, including without limitation Intel® Atom®, Celeron®, Core (2) Duo®, Core i3, Core i5, Core i7, Itanium®, Pentium®, Xeon® or Xeon Phi® processors, ARM processors, and similar processors. Circuitry 520 may include at least one cache 535 to store data.

According to some examples, primary memory 530 may be composed of one or more memory devices or dies which may include various types of volatile and/or non-volatile memory. Volatile types of memory may include, but are not limited to, dynamic random-access memory (DRAM), static random-access memory (SRAM), thyristor RAM (TRAM) or zero-capacitor RAM (ZRAM). Non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above. In another embodiment, primary memory 530 may include one or more hard disk drives within and/or accessible by service provider 120.

Figure 6:
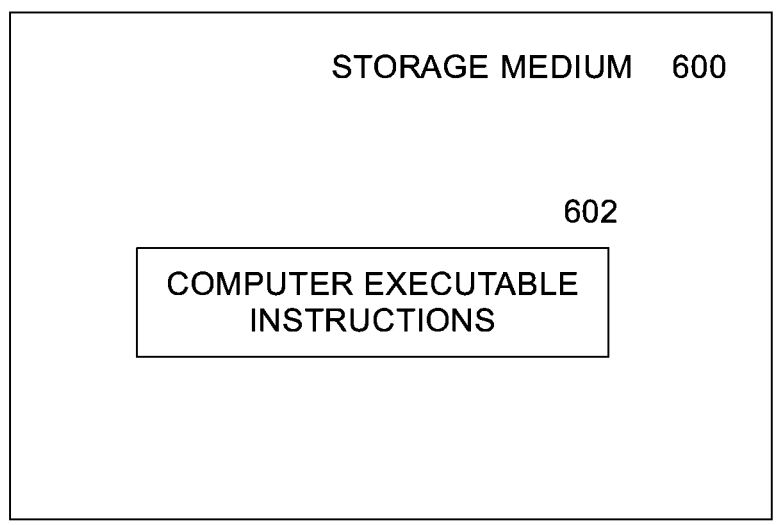
FIG. 6 illustrates an example of a storage medium.

FIG. 6 illustrates an example of a storage medium 600. Storage medium 600 may comprise an article of manufacture. In some examples, storage medium 600 may include any non-transitory computer readable medium or machine readable medium, such as an optical, magnetic or semiconductor storage. Storage medium 600 may store various types of computer executable instructions, such as instructions 602 to implement logic flows described above in FIGS. 1 through 4. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 7:
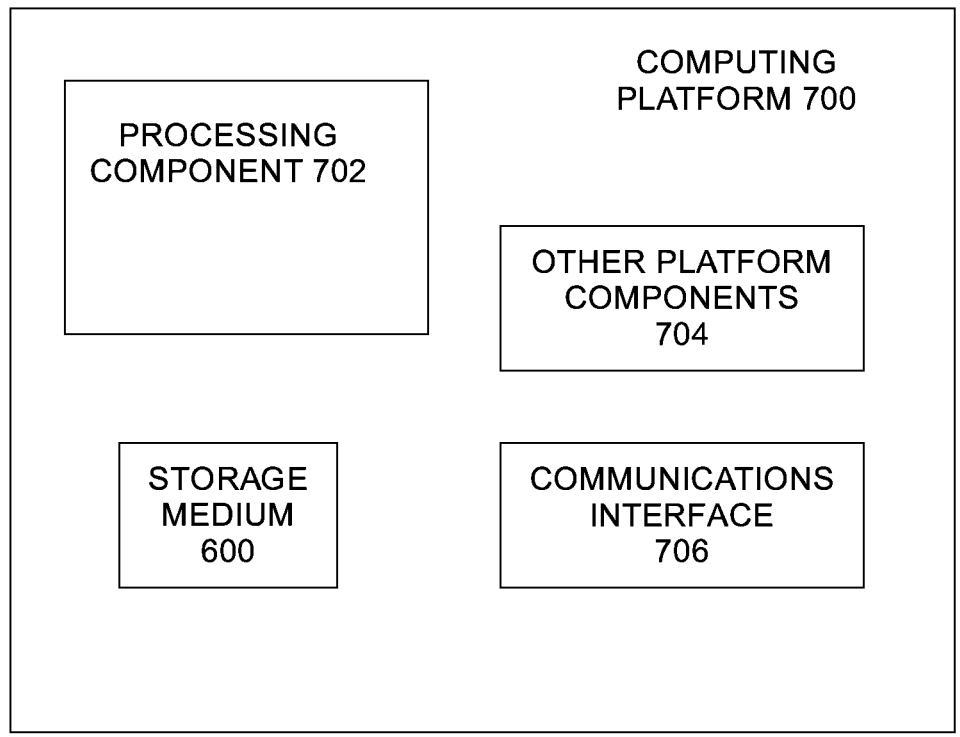
FIG. 7 illustrates another example computing platform.

FIG. 7 illustrates an example computing platform 700. In some examples, as shown in FIG. 7, computing platform 700 may include a processing component 702, other platform components 704 and/or a communications interface 706.

According to some examples, processing component 702 may execute processing operations or logic for instructions stored on storage medium 600. Processing component 702 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 704 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), types of non-volatile memory such as 3-D crosspoint memory that may be byte or block addressable. Non-volatile types of memory may also include other types of byte or block addressable non-volatile memory such as, but not limited to, multi-threshold level NAND flash memory, NOR flash memory, single or multi-level PCM, resistive memory, nanowire memory, FeTRAM, MRAM that incorporates memristor technology, STT-MRAM, or a combination of any of the above. Other types of computer readable and machine-readable storage media may also include magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 706 may include logic and/or features to support a communication interface. For these examples, communications interface 706 may include one or more communication interfaces that operate according to various communication protocols or standards to communicate over direct or network communication links or channels. Direct communications may occur via use of communication protocols or standards described in one or more industry standards (including progenies and variants) such as those associated with the peripheral component interconnect express (PCIe) specification. Network communications may occur via use of communication protocols or standards such those described in one or more Ethernet standards promulgated by the Institute of Electrical and Electronics Engineers (IEEE). For example, one such Ethernet standard may include IEEE 802.3. Network communication may also occur according to one or more OpenFlow specifications such as the OpenFlow Switch Specification.

The components and features of computing platform 700, including logic represented by the instructions stored on storage medium 600 may be implemented using any combination of discrete circuitry, ASICs, logic gates and/or single chip architectures. Further, the features of computing platform 700 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 700 shown in the block diagram of FIG. 7 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASIC, programmable logic devices (PLD), digital signal processors (DSP), FPGA, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Included herein are logic flows or schemes representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow or scheme may be implemented in software, firmware, and/or hardware. In software and firmware embodiments, a logic flow or scheme may be implemented by computer executable instructions stored on at least one non-transitory computer readable medium or machine readable medium, such as an optical, magnetic or semiconductor storage. The embodiments are not limited in this context.

Some examples are described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   a processing device; and
   a memory device coupled to the processing device, the memory device having instructions stored thereon that, in response to execution by the processing device, cause the processing device to:
   intercept, via a rate enforcer, a request from a client for one of a plurality of services to performed, the client belonging to an organization, the request corresponding to a processing resources rate for performing the request;
   determine, by the rate enforcer, a current threshold of resource bandwidth for the organization by applying a real time data model and a historical data model, wherein the current threshold is a dynamic rate limit specific to the organization, the real time data model generating a first threshold at least in part by determining a number of real time requests received from the organization over a first preceding period of time; the historical data model generating a second threshold, the historical data model being generated by applying a machine learning model to historical data stored during processing of previous requests for the plurality of services from the organization over a second preceding period of time, the current threshold being the average of real time requests and historical requests, wherein the current threshold is used to validate the rate limit for the client;
   perform the request if the processing resources rate for performing the request does not exceed the current threshold; and
   deny the request if the processing resources rate for performing the request does exceed the current threshold.

2. The apparatus of claim 1, wherein the memory device includes instructions stored thereon that, in response to execution by the processing device, cause the processing device to:
   determine a current threshold for each one of a plurality of organizations.

3. The apparatus of claim 1, wherein the memory device includes instructions stored thereon that, in response to execution by the processing device, cause the processing device to:
   determine a current threshold for a plurality of clients in the organization.

4. The apparatus of claim 1, wherein the memory device includes instructions stored thereon that, in response to execution by the processing device, cause the processing device to:
   regenerate the historical data model on a predetermined time schedule.

5. The apparatus of claim 1, wherein the memory device includes instructions stored thereon that, in response to execution by the processing device, cause the processing device to:
   regenerate the historical data model when the historical data model becomes stale.

6. The apparatus of claim 1, wherein the memory device includes instructions stored thereon that, in response to execution by the processing device, cause the processing device to:
   generate the second threshold by the historical data model based at least in part on times of day of previous requests.

7. The apparatus of claim 1, wherein the memory device includes instructions stored thereon that, in response to execution by the processing device, cause the processing device to:
   generate the second threshold by the historical data model based at least in part on days of the week of previous requests.

8. The apparatus of claim 1, wherein the memory device includes instructions stored thereon that, in response to execution by the processing device, cause the processing device to:
   temporarily change a current threshold for another organization.

9. The apparatus of claim 1, wherein the memory device includes instructions stored thereon that, in response to execution by the processing device, cause the processing device to:
   generate the historical data model by dividing the historical data into a training data set, a cross-validation data set, and a testing data set, selecting a first machine learning model, training the first machine learning model on the training data set, and tuning hyperparameters of the first machine learning model using the cross-validation data set.

10. The apparatus of claim 9, wherein the memory device includes instructions stored thereon that, in response to execution by the processing device, cause the processing device to:
    determine performance results of the first machine learning model on the cross-validation data set;
    select a second machine learning model, train the second machine learning model on the training data set, and tune hyper-parameters of the second machine learning model using the cross-validation set;
determine performance results of the second machine learning model on the cross-validation data set;
select the first machine learning model when the first machine learning model has better performance results than the second machine learning model, otherwise select the second machine learning model.

11. A method to be performed by a processor in a computing system, comprising:
intercepting, via a rate enforcer, a request from a client for one of a plurality of services to performed, the client belonging to an organization, the request corresponding to a processing resources rate for performing the request;
determining, by the rate enforcer, a current threshold of resource bandwidth for the organization by applying a real time data model and a historical data model, wherein the current threshold is a dynamic rate limit specific to the organization, the real time data model generating a first threshold at least in part by determining a number of real time requests received from the organization over a first preceding period of time; the historical data model generating a second threshold, the historical data model being generated by applying a machine learning model to historical data stored during processing of previous requests for the plurality of services from the organization over a second preceding period of time, the current threshold being the average of real time requests and historical requests, wherein the current threshold is used to validate the rate limit for the client;
performing the request if the processing resources rate for performing the request does not exceed the current threshold; and
denying the request if the processing resources rate for performing the request does exceed the current threshold.

12. The method of claim 11, comprising determining a current threshold for each one of a plurality of organizations.

13. The method of claim 11, comprising determining a current threshold for a plurality of clients in the organization.

14. The method of claim 11, comprising regenerating the historical data model on a predetermined time schedule.

15. The method of claim 11, comprising regenerating the historical data model when the historical data model becomes stale.

16. The method of claim 11, comprising generating the second threshold by the historical data model based at least in part on times of day of previous requests.

17. The method of claim 11, comprising generating the second threshold by the historical data model based at least in part on days of the week of previous requests.

18. The method of claim 11, comprising temporarily change a current threshold for another organization.

19. The method of claim 11, comprising generating the historical data model by dividing the historical data into a training data set, a cross-validation data set, and a testing data set, selecting a first machine learning model, training the first machine learning model on the training data set, and tuning hyper-parameters of the first machine learning model using the cross-validation data set.

20. The method of claim 19, comprising:
determining performance results of the first machine learning model on the cross-validation data set;
selecting a second machine learning model, training the second machine learning model on the training data set, and tuning hyper-parameters of the second machine learning model using the cross-validation set;
determining performance results of the second machine learning model on the cross-validation data set;
selecting the first machine learning model when the first machine learning model has better performance results than the second machine learning model, otherwise select the second machine learning model.

21. At least one non-transitory machine-readable medium comprising a plurality of instructions that in response to being executed by a processor in a computing system cause the processor to:
intercept, via a rate enforcer, a request from a client for one of a plurality of services to performed, the client belonging to an organization, the request corresponding to a processing resources rate for performing the request;
determine, by the rate enforcer, a current threshold of resource bandwidth for the organization by applying a real time data model and a historical data model, wherein the current threshold is a dynamic rate limit specific to the organization, the real time data model generating a first threshold at least in part by determining a number of real time requests received from the organization over a first preceding period of time; the historical data model generating a second threshold, the historical data model being generated by applying a machine learning model to historical data stored during processing of previous requests for the plurality of services from the organization over a second preceding period of time, the current threshold being the average of real time requests and historical requests, wherein the current threshold is used to validate the rate limit for the client;
perform the request if the processing resources rate for performing the request does not exceed the current threshold; and
deny the request if the processing resources rate for performing the request does exceed the current threshold.

22. The at least one non-transitory machine-readable medium of claim 21, comprising instructions that in response to being executed by a processor in a computing system cause the processor to:
regenerate the historical data model on a predetermined time schedule.

23. The at least one non-transitory machine-readable medium of claim 21, comprising instructions that in response to being executed by a processor in a computing system cause the processor to:
regenerate the historical data model when the historical data model becomes stale.

24. The at least one non-transitory machine-readable medium of claim 21, comprising instructions that in response to being executed by a processor in a computing system cause the processor to:
temporarily reduce a current threshold for another organization.

25. The at least one non-transitory machine-readable medium of claim 21, comprising instructions that in response to being executed by a processor in a computing system cause the processor to:
generate the historical data model by dividing the historical data into a training data set, a cross-validation data set, and a testing data set, selecting a first machine learning model, training the first machine learning model on the training data set, and tuning hyper-parameters of the first machine learning model using the cross-validation data set.

26. The at least one non-transitory machine-readable medium of claim 25, comprising instructions that in response to being executed by a processor in a computing system cause the processor to:
  determine performance results of the first machine learning model on the cross-validation data set;
  select a second machine learning model, train the second machine learning model on the training data set, and tune hyper-parameters of the second machine learning model using the cross-validation set;
  determine performance results of the second machine learning model on the cross-validation data set;
  select the first machine learning model when the first machine learning model has better performance results than the second machine learning model, otherwise select the second machine learning model.

* * * * *